UNITED STATES PATENT OFFICE.

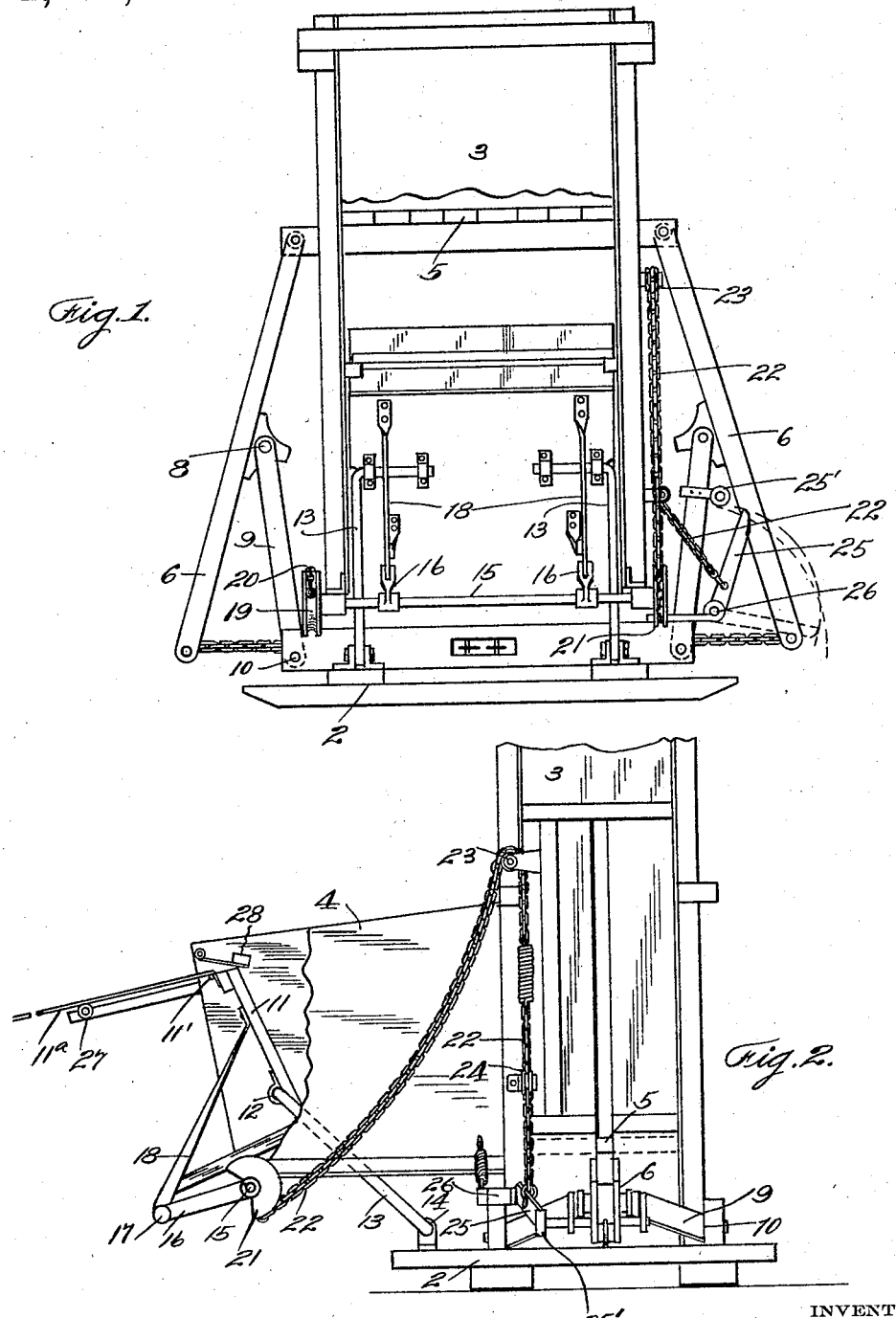

LANCE J. TOFFELMIER, OF SAN LEANDRO, AND CHARLES L. MILLER, OF OAKLAND, CALIFORNIA, ASSIGNORS TO JUNIOR MONARCH HAY PRESS CO., OF SAN LEANDRO, CALIFORNIA, A CORPORATION OF CALIFORNIA.

HAY-PRESS.

1,179,146.      Specification of Letters Patent.      Patented Apr. 11, 1916.

Application filed February 3, 1915. Serial No. 5,883.

*To all whom it may concern:*

Be it known that we, LANCE J. TOFFELMIER, of San Leandro, county of Alameda, State of California, and CHARLES L. MILLER, of Oakland, county of Alameda, State of California, citizens of the United States, have invented new and useful Improvements in Hay-Presses, of which the following is a specification.

This invention relates to hay presses and particularly to a press having a follower and a hay feeder or pusher operative by the follower.

It is the object of the present invention to provide improvements in hay presses, whereby the hay feeder or pusher by which the hay is forced into the baling chamber of the press is retracted or opened by the follower in the baling chamber on its downward stroke or movement. This achievement is advantageous because the pusher is opened at just the proper time, permitting the hay to fall into the press chamber only after the follower is down and thus prevent hay getting beneath the follower as often happens with troublesome effects.

The invention consists of the parts and the construction and combination of parts as hereinafter more fully described and claimed, having reference to the accompanying drawings, in which—

Figure 1 is a rear view of the press partly broken away and showing the pusher closed with the follower up. Fig. 2 is a side elevation partly broken away and showing the pusher back or open and the follower down.

2 indicates the frame, 3 the baling chamber and 4 the feed box of the press. Vertically movable in the chamber is a horizontal cross-head or follower 5, to the projecting ends of which are pivoted toggle levers 6, centrally fulcrumed at 8 upon the swinging ends of radius links 9. The links are pivoted at 10 to the frame 2. To the follower levers 6 are connected any suitable actuating means (not here shown) by which they are drawn to upright position.

In the feed box 4 is a door or pusher 11 pivoted at 12 upon swinging arms 13, at the sides of the box, and pivoted at 14 to the frame. The pusher is moved to and fro in the box by a shaft 15 having cranks 16 pivoted at 17 to braces 18 projecting rearward from the pusher. On one end of the crankshaft 15 is a sheave 19, to which is attached a chain or other element 20 by which the sheave is pulled or turned in such a direction as to rotate the shaft to close or move the door inwardly toward the baling chamber. Also secured on the shaft 15 is a sheave 21, attached to which is a chain or other element 22 passing over guide pulley 23—24 and connected at its other end to a lever 25. This lever is pivoted at 26 on the frame 2 at a point eccentric to the pivot 10 of the toggle link 9.

It is very desirable that the process of delivering hay to the press by the men may be continuous and, therefore, to prevent hay from falling into the box 4, while the pusher is forward, to the latter is pivoted at 11' a flat plate 11ª on which the hay will accumulate while the pusher is forward, to which position it is moved by the pulling of chain 20. The plate 11 is supported by suitable means, as a roller or rollers 27. For cleaning the plate of its load of hay, there is provided a scraper 28 resting on its top and attached to the side walls of the box 4.

The operation of the improvement is as follows: After the box 4 has been charged with hay, the pusher is closed by the crankshaft to throw the hay into the baling chamber, and with this movement the chain 22 is wound up on sheave 21 and by it the lever 25 is raised (Fig. 1). Following the pusher feeding movement the follower 5 is elevated by the toggle mechanism. As the radius links on the side of the press, with the lever 25, swing up they carry a dog with a roller 25' against and past the lifted arm or lever 25; the latter dropping back in front of the roller as this clears the end of the arm 25 owing to the eccentricity of the pivots 26—10. When the follower is released it falls and the roller 25' moves against and forces down the arm 25, thus pulling on its chain 22. This rotates its pulley 21 and the crank shaft 15 which retracts the door or pusher 11. From this it will be seen that we provide a pusher which is opened by the downward movement of, with and by the follower; the hay on the plate 11ᵃ falling into the box and between the pusher and the lowered follower.

Having thus described our invention, what we claim and desire to secure by Letters Patent is—

1. In a hay press, a baling chamber, a follower operable therein, a pusher operative to charge hay into the chamber, means for advancing the pusher, a follower operating mechanism including a pivotally mounted member, and a pivotally mounted lever connected to the pusher only for retracting the latter and being normally free from and adapted to be engaged by the pivotal member of the follower operating mechanism for actuating the lever to retract the pusher.

2. In a hay press, a baling chamber, a follower movable vertically in said chamber, a pusher operative to charge hay into the chamber, means for advancing the pusher prior to the compressing movement of the follower, and means connected to the pusher for retracting the same and operative by the return or idle movement of the follower.

3. In a hay press, a baling chamber, a follower operable therein, a pusher operative to charge hay into the chamber, a pusher advancing mechanism including a swingingly mounted lever operable for retracting the pusher and adapted to be set by the advancing mechanism, and a follower operating mechanism including a swingingly mounted member eccentric to the lever and adapted to engage therewith on return movement of the follower to retract the pusher.

4. In a hay press, a baling chamber, a follower operable therein, a pusher operative to charge hay into the chamber, a pusher advancing mechanism including a swingingly mounted lever operable for retracting the pusher from advanced position, a follower operating mechanism including a member pivoted eccentrically to the mounting of the lever, and a roller carried by the eccentrically mounted member and adapted to engage with the lever on return movement of the follower, the roller riding off from the lever through the eccentric mountings whereby the lever is free for movement.

5. A hay press comprising a baling chamber and a feed box, a follower in the chamber, a feeding pusher operative in the box to charge the chamber and having a hay receiving top plate, means operative by the follower on its withdrawing movement to retract the pusher, and a pivotally mounted scraper mounted on the box for clearing the hay from the plate during its retraction.

In testimony whereof we have hereunto set our hands in the presence of two subscribing witnesses.

LANCE J. TOFFELMIER.
CHARLES L. MILLER.

Witnesses:
ELLIE HOOLEY,
J. C. TOFFELMIER.

Copies of this patent may be obtained for five cents each, by addressing the "Commissioner of Patents, Washington, D. C."